(12) United States Patent
Kim et al.

(10) Patent No.: US 10,911,658 B2
(45) Date of Patent: Feb. 2, 2021

(54) METHOD FOR GENERATING DIRECTION INFORMATION OF OMNIDIRECTIONAL IMAGE AND DEVICE FOR PERFORMING THE METHOD

(71) Applicant: LINKFLOW CO., LTD, Seoul (KR)

(72) Inventors: Yongkuk Kim, Gyeonggi-do (KR); Sungrae Cho, Seoul (KR); Yongjin Kim, Busan (KR); Junse Kim, Gyeonggi-do (KR)

(73) Assignee: LINKFLOW CO., LTD, Seoul (KR)

( * ) Notice: Subject to any disclaimer, the term of this patent is extended or adjusted under 35 U.S.C. 154(b) by 0 days.

(21) Appl. No.: 16/488,254

(22) PCT Filed: Jun. 19, 2017

(86) PCT No.: PCT/KR2017/006420
§ 371 (c)(1),
(2) Date: Aug. 23, 2019

(87) PCT Pub. No.: WO2018/164317
PCT Pub. Date: Sep. 13, 2018

(65) Prior Publication Data
US 2020/0007728 A1    Jan. 2, 2020

(30) Foreign Application Priority Data

Mar. 7, 2017 (KR) .................. 10-2017-0028756

(51) Int. Cl.
*H04N 5/225* (2006.01)
*H04N 5/232* (2006.01)
*H04N 5/262* (2006.01)

(52) U.S. Cl.
CPC ....... *H04N 5/2259* (2013.01); *H04N 5/23238* (2013.01); *H04N 5/23296* (2013.01); *H04N 5/2621* (2013.01); *H04N 5/2628* (2013.01)

(58) Field of Classification Search
None
See application file for complete search history.

(56) References Cited

U.S. PATENT DOCUMENTS 9,686,466 B1 *  6/2017  Billinghurst ....... H04N 5/23238
10,127,632 B1 * 11/2018  Burke .................. G06T 3/4038
(Continued)

FOREIGN PATENT DOCUMENTS

| EP | 2485191 A1 | 8/2012 |
|---|---|---|
| JP | 2003-244511 A | 8/2003 |

(Continued)

OTHER PUBLICATIONS

International Preliminary Report on Patentability (Chapter I) dated Sep. 10, 2019, in corresponding International application No. PCT/KR2017/006420; 8 pages.
Office Action dated Jul. 11, 2017, in corresponding Korean application No. 10-2017-0028756 including partial machine-generated English language translation; 7 pages.
English translation of International Search Report dated Sep. 13, 2018, in corresponding International application No. PCT/KR2017/006420; 2 pages.

(Continued)

*Primary Examiner* — Rebecca A Volentine
(74) *Attorney, Agent, or Firm* — Maier & Maier, PLLC

(57) ABSTRACT

A method for generating direction information of an omnidirectional image and a device for performing the method. The method for generating direction information of an omnidirectional image can include the steps of: a direction information processing device receiving direction information of an omnidirectional image; and the direction information processing device setting a direction indicator with respect to the omnidirectional image on the basis of the direction information, wherein the direction indicator can indicate at least one direction on a playback screen of the omnidirectional image.

17 Claims, 13 Drawing Sheets

(56) References Cited

U.S. PATENT DOCUMENTS

| | | | |
|---|---|---|---|
| 2010/0302347 A1 | 12/2010 | Shikata | |
| 2014/0168056 A1* | 6/2014 | Swaminathan | G06F 3/147 345/156 |
| 2014/0375683 A1* | 12/2014 | Salter | G02B 27/0172 345/633 |
| 2015/0029304 A1 | 1/2015 | Park | |
| 2016/0269631 A1* | 9/2016 | Jiang | H04N 5/23238 |
| 2017/0053545 A1* | 2/2017 | Yang | G06F 3/005 |
| 2017/0316806 A1* | 11/2017 | Warren | G11B 27/031 |

FOREIGN PATENT DOCUMENTS

| | | |
|---|---|---|
| KR | 10-2006-0006186 A | 1/2006 |
| KR | 10-2007-0105108 A | 10/2007 |
| KR | 10-2009-0118461 A | 11/2009 |
| KR | 10-2011-0075730 A | 7/2011 |
| KR | 2015-0011705 A | 2/2015 |

OTHER PUBLICATIONS

English translation of Written Opinion dated Jul. 5, 2019, in corresponding International application No. PCT/KR2017/006420; 7 pages.

English translation of International Search Report and Written Opinion dated Dec. 4, 2017 in corresponding International application No. PCT/KR2017/006420; 7 pgs.

Extended European search report dated Dec. 11, 2019, in corresponding European patent application No. 17899304.4; 7 pages.

Fedorov et al. "A Framework for Outdoor Mobile Augmented Reality and Its Application to Mountain Peak Detection", 2016, pp. 281-301, AVR 2016, Part I, LNCS, vol. 9768.

Office Action dated Mar. 18, 2020 in corresponding Korean Application No. 10-2017-0164249; 8 pages including English-language translation.

* cited by examiner

FIG. 1
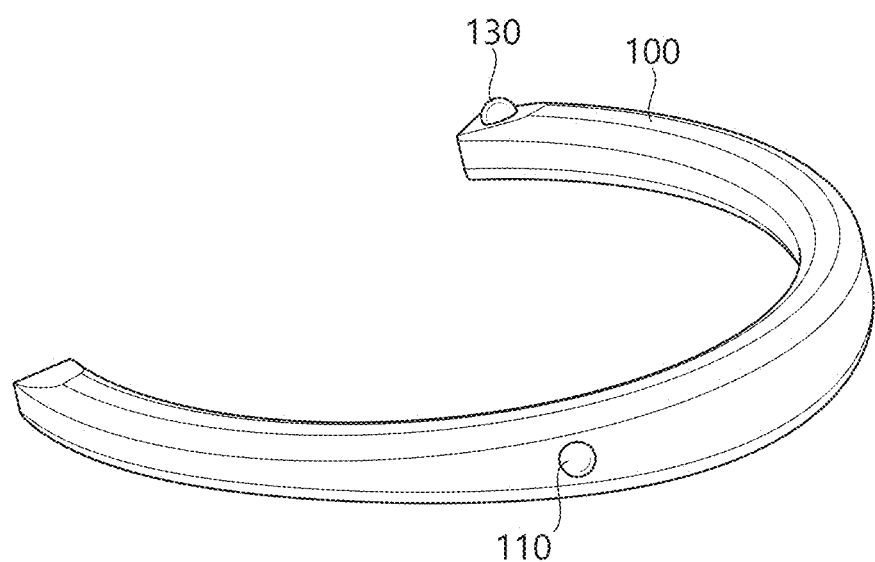
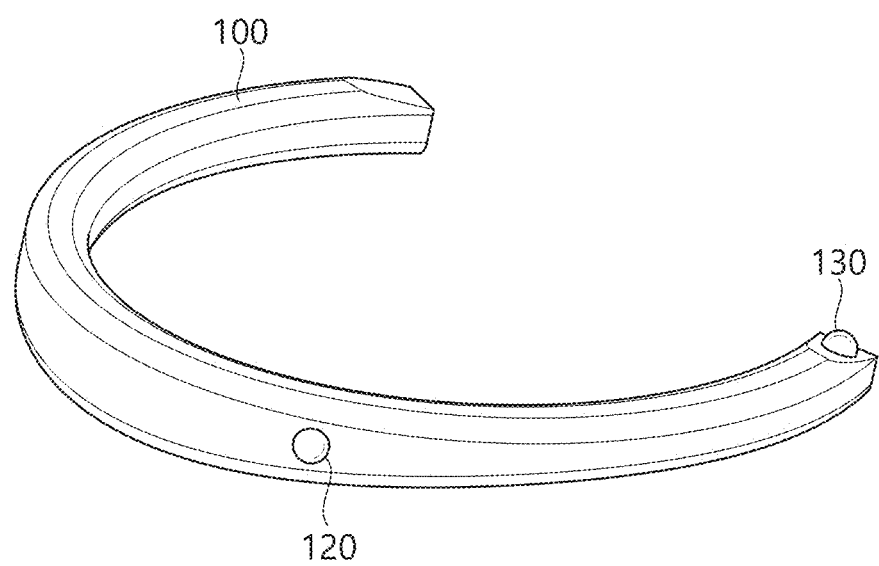

FIG. 3
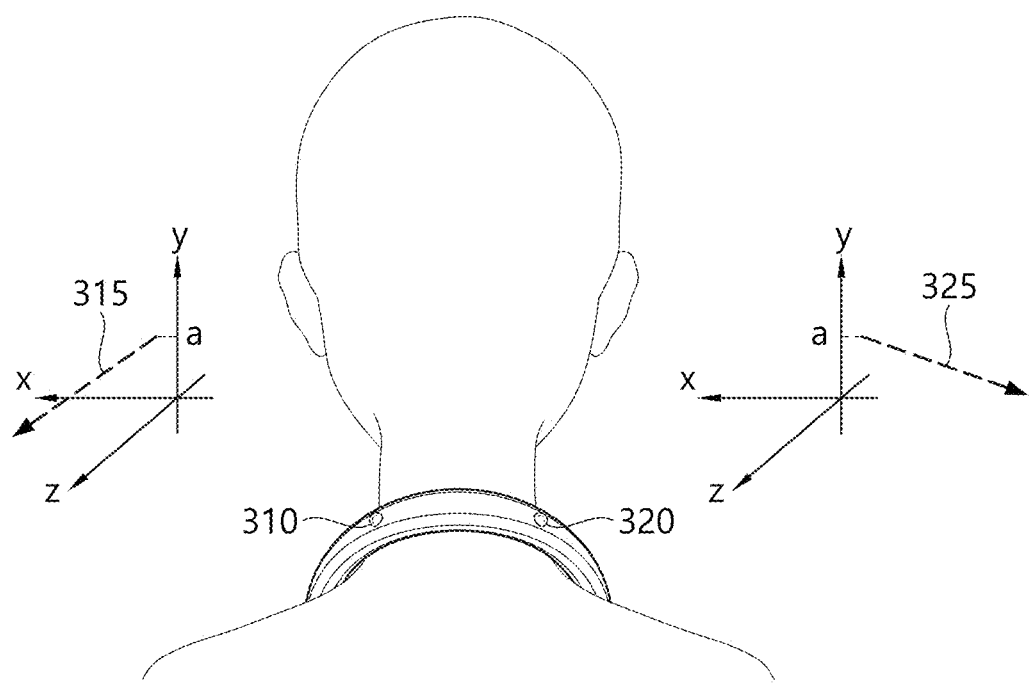
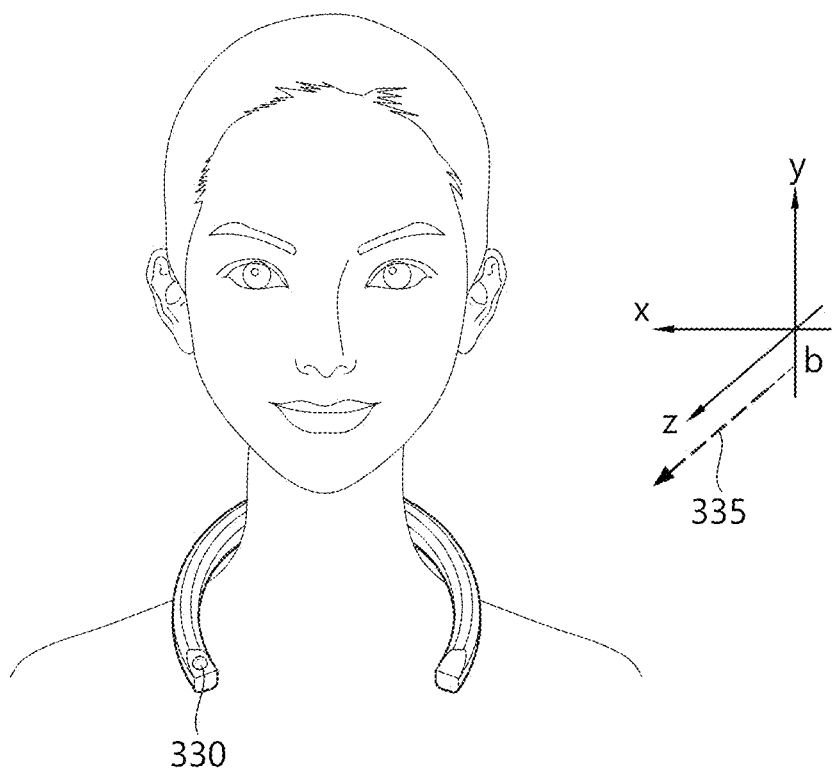

FIG. 4
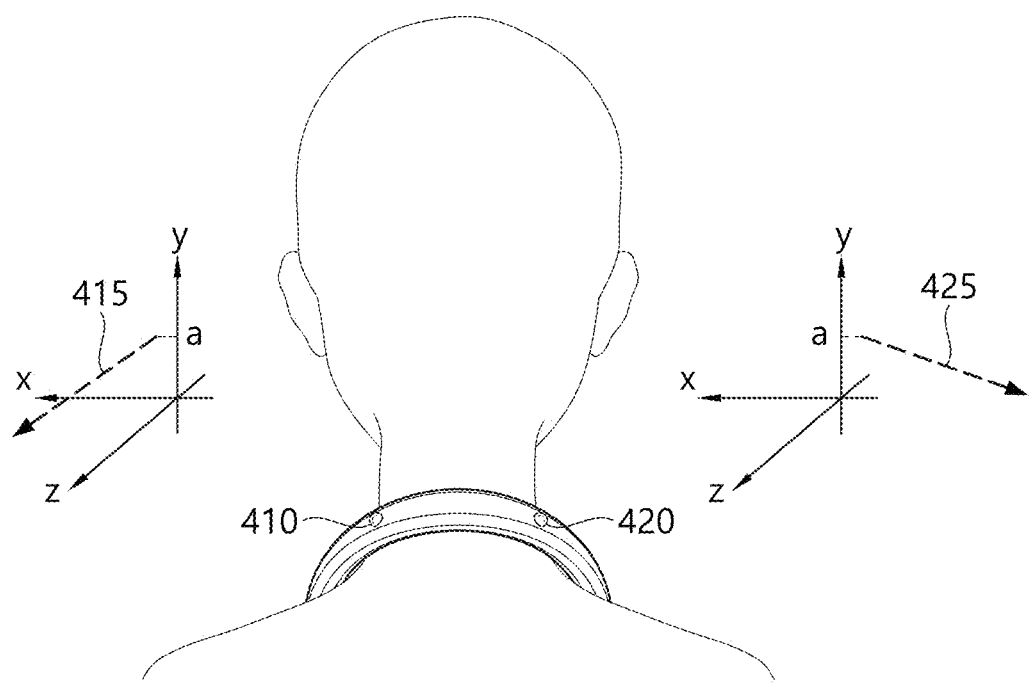
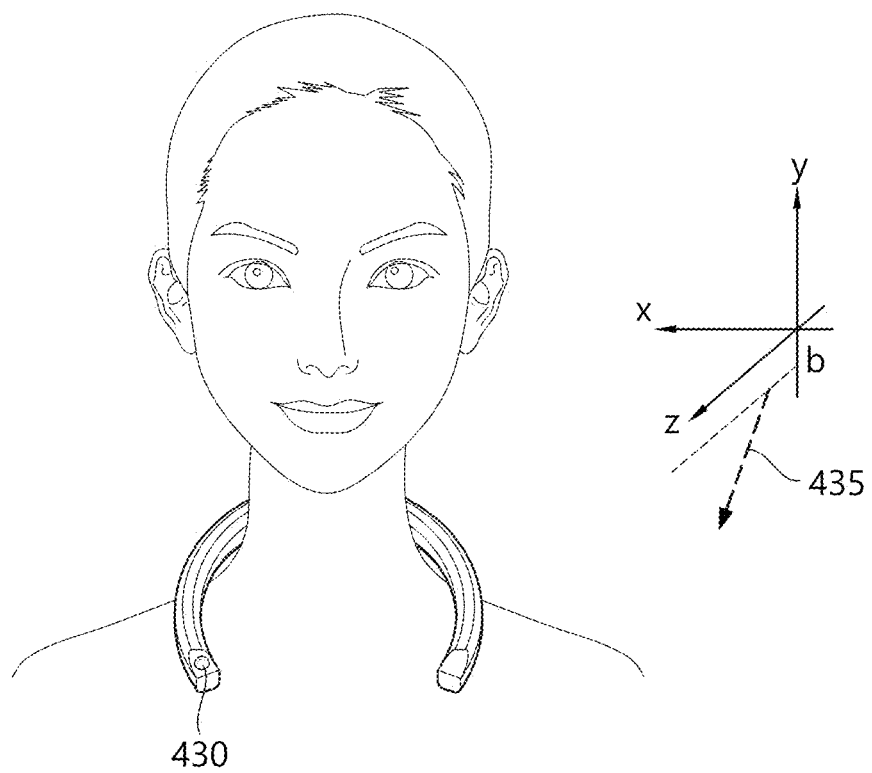

FIG. 8
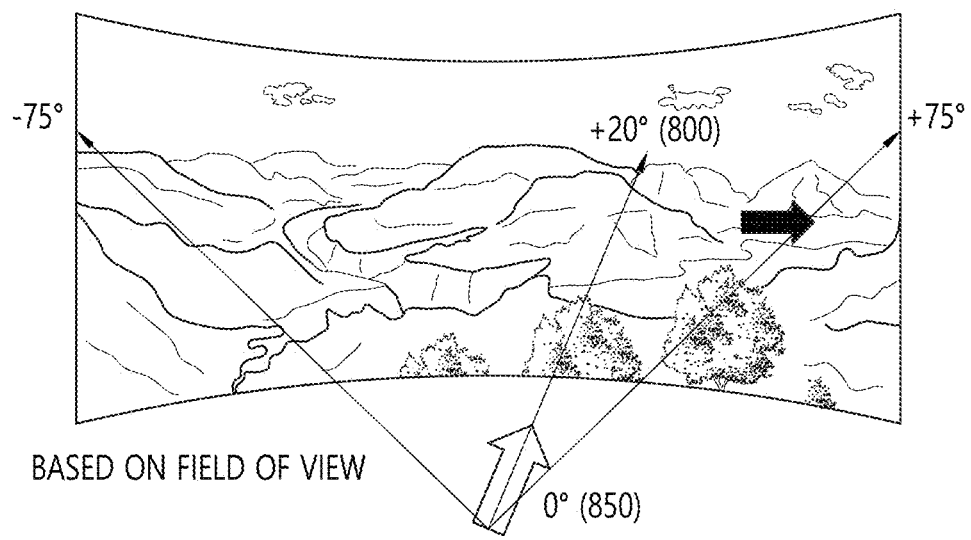
BASED ON FIELD OF VIEW
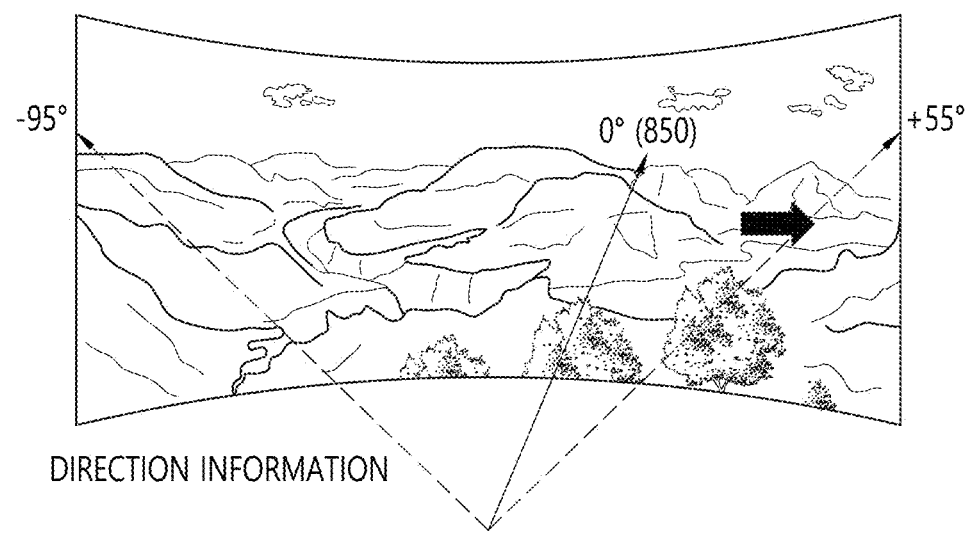
DIRECTION INFORMATION

FIG. 10
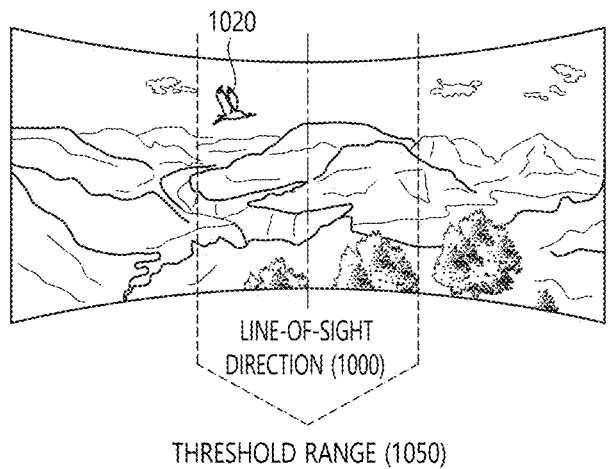
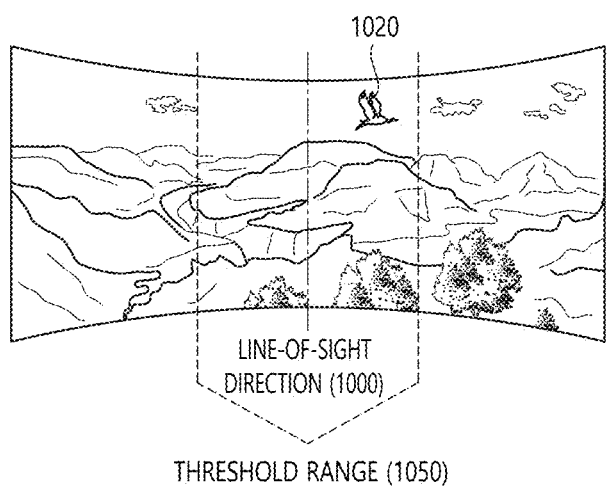
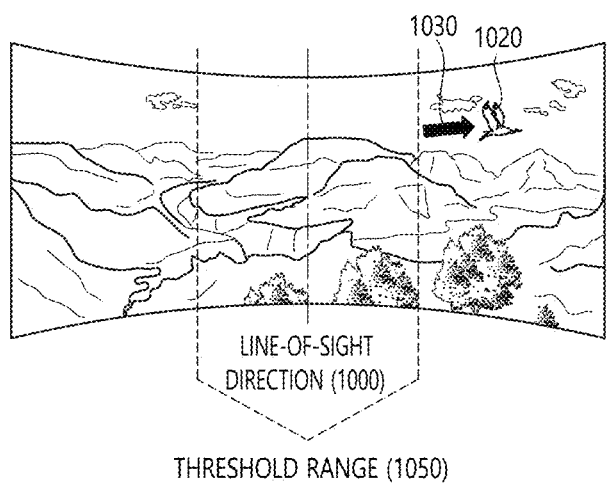

FIG. 11
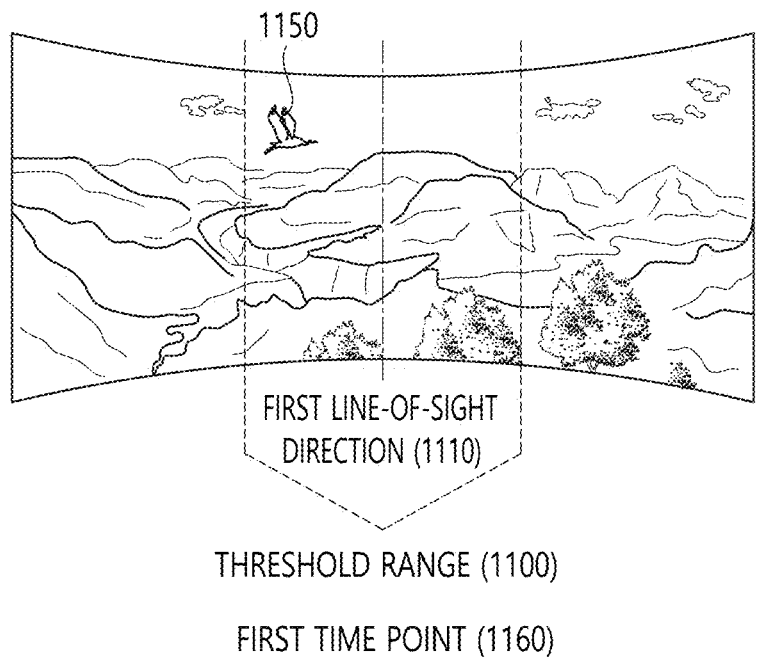
FIRST TIME POINT (1160)
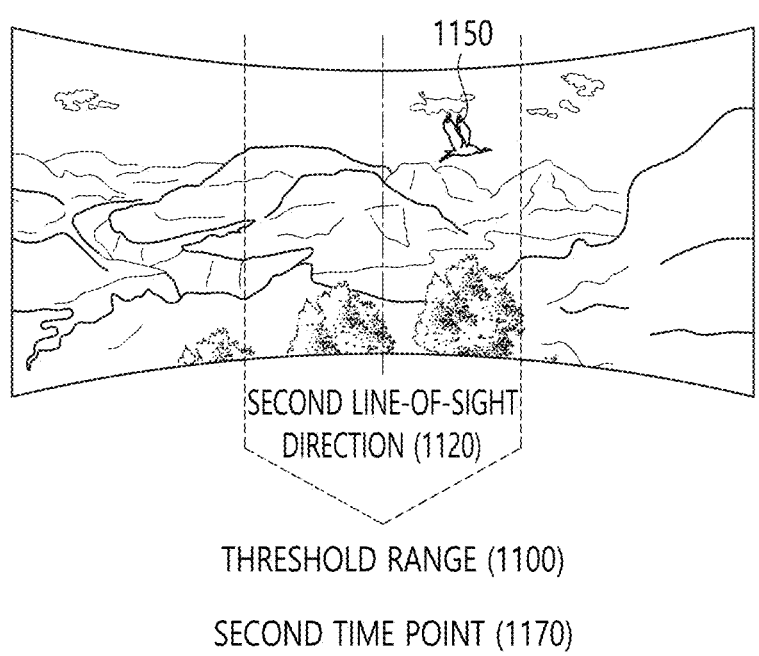
SECOND TIME POINT (1170)

METHOD FOR GENERATING DIRECTION INFORMATION OF OMNIDIRECTIONAL IMAGE AND DEVICE FOR PERFORMING THE METHOD

FIELD

The present invention relates to a method of generating direction information of an omnidirectional image and a device for performing the method, and more particularly, to a method and device for generating direction information when an omnidirectional image is generated and delivering the direction information to a user who views the omnidirectional image when the omnidirectional image is played back.

BACKGROUND

An omnidirectional imaging system is an imaging system capable of recording image information of all directions (360 degrees) from a particular point. Since the omnidirectional imaging system can provide very wide field-of-view images, as compared to an existing imaging system, the range of applications of the omnidirectional imaging system has increasingly been broadened not only to research fields such as the fields of computer vision and mobile robots, but also to practical fields such as the fields of surveillance systems, virtual reality systems, and pan-tilt-zoom (PTZ) cameras, and video conferencing.

Various methods can be used to obtain an omnidirectional image. For example, images may be obtained by rotating one camera with respect to an optical axis that satisfies a single view point, and an omnidirectional image may be generated by combining the images. In another example, a method may be used in which a plurality of cameras are arranged into an annular structure and images obtained by the plurality of cameras are combined. A user may generate an omnidirectional image using various omnidirectional image processing apparatuses (or omnidirectional image processing cameras, 360 degrees cameras) for obtaining an omnidirectional image.

An omnidirectional image generated by a current omnidirectional image processing device is image content generated by capturing images of all directions. Therefore, due to this characteristic of an omnidirectional image, a user who views the omnidirectional image should look around to find something to look at or change his or her field of view until a target object is found. For example, when an image for tracking a criminal is generated as omnidirectional image content, the image may be frequently rotated to find the location of the criminal. In this case, the sense of direction may be lost, and a user may feel dizzy.

Therefore, there is a need for a method allowing a user to easily and conveniently recognize an omnidirectional image generated by an omnidirectional image processing device.

SUMMARY

The present invention is directed to solving all the aforementioned problems.

Also, the present invention is directed to adding direction information as attribute information of omnidirectional image information generated by an omnidirectional image processing device and displaying the direction information when the omnidirectional image information is played back.

Further, the present invention is directed to causing a user to turn his or her line of sight to a specific direction on the basis of direction information included in omnidirectional image information generated by an omnidirectional image processing device.

Representative configurations of the present invention for achieving the objectives are as follows.

One aspect of the present invention provides a method of generating direction information of an omnidirectional image, the method including a step of receiving, by a direction information processing device, direction information of an omnidirectional image and a step of setting, by the direction information processing device, a direction indicator for the omnidirectional image on the basis of the direction information, wherein the direction indicator may indicate at least one direction on a playback screen of the omnidirectional image.

Another aspect of the present invention provides a direction information processing device for generating direction information of an omnidirectional image, the device including a communication unit configured to receive direction information of an omnidirectional image and a processor configured to be operatively connected to the communication unit and set a direction indicator for the omnidirectional image on the basis of the direction information, wherein the direction indicator may indicate at least one direction on a playback screen of the omnidirectional image.

Advantageous Effects

According to the present invention, direction information is added as attribute information of omnidirectional image information generated by an omnidirectional image processing device, and the direction information is displayed when the omnidirectional image information is played back. Therefore, a user can recognize a direction when viewing the omnidirectional image, and thus it is possible to help the user to understand the omnidirectional image.

Also, according to the present invention, a direction indicator can be additionally displayed as played-back omnidirectional image information on the basis of direction information, and it is possible to generate and view an omnidirectional image on the basis of the direction indicator according to a photographic intention of a photographer.

Further, according to the present invention, it is possible to cause a user who views an omnidirectional image to turn his or her line of sight to a specific direction on the basis of direction information included in omnidirectional image information. Therefore, the omnidirectional image can be provided to the user with a higher sense of immersion.

BRIEF DESCRIPTION OF THE DRAWINGS

FIG. 1 is a schematic view illustrating an omnidirectional image processing apparatus according to an exemplary embodiment of the present inventive concept.

FIG. 3 is a schematic view illustrating image capturing lines of a plurality of image capturing units according to an exemplary embodiment of the present inventive concept.

FIG. 4 is a schematic view illustrating image capturing lines of a plurality of image capturing units according to an exemplary embodiment of the present inventive concept.

FIG. 8 is a conceptual view showing a method of generating direction information according to an embodiment of the present invention.

FIG. 10 is a conceptual view showing a method of generating identification information by considering a user's interest according to an embodiment.

FIG. 11 is a conceptual view showing a method of determining a user's object of interest according to an embodiment of the present invention.

DETAILED DESCRIPTION

Figure 2:
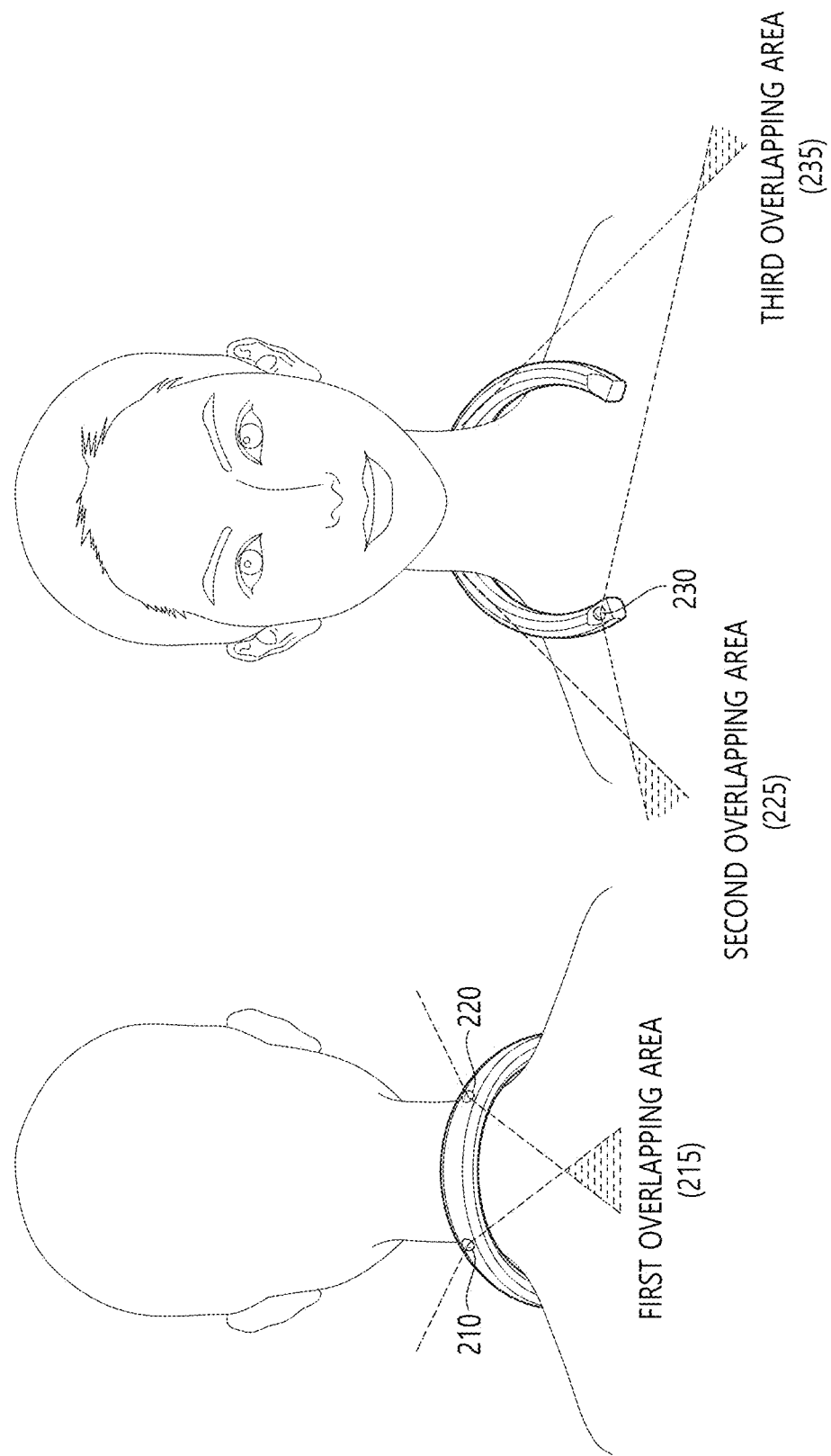
FIG. 2 is a schematic view showing the characteristics of a plurality of image capturing units provided in the omnidirectional image processing apparatus according to an exemplary embodiment of the present inventive concept.

In the following detailed description of the present inventive concept, references are made to the accompanying drawings that show, by way of illustration, specific embodiments in which the present inventive concept may be practiced. These embodiments are described in sufficient detail to enable those skilled in the art to practice the present inventive concept. It is to be understood that the various embodiments of the present inventive concept, although different from each other, are not necessarily mutually exclusive. For example, specific shapes, structures and characteristics described herein may be implemented as modified from one embodiment to another without departing from the spirit and scope of the present inventive concept. Furthermore, it shall be understood that the locations or arrangements of individual components within each embodiment may also be modified without departing from the spirit and scope of the present inventive concept. Therefore, the following detailed description is not to be taken in a limiting sense, and the scope of the present inventive concept is to be taken as encompassing the scope of the appended claims and all equivalents thereof. In the drawings, like reference numerals refer to the same or similar elements throughout the several views.

Hereinafter, preferred embodiments of the present inventive concept will be described in detail with reference to the accompanying drawings to enable those skilled in the art to easily implement the present inventive concept.

Meanwhile, it should be understood that the term "omnidirectional image processing apparatus" herein encompasses a omnidirectional camera (360 degrees camera) capable of capturing an omnidirectional image (or a 360-degree image).

FIG. 1 is a schematic view illustrating an omnidirectional image processing apparatus according to an exemplary embodiment of the present inventive concept.

The structure of the omnidirectional image processing apparatus according to an exemplary embodiment of the present inventive concept is as illustrated in FIG. 1.

Referring to FIG. 1, an omnidirectional image processing apparatus 100 may have a wearable structure and may have a necklace-like shape that can be worn around the neck of a user. The omnidirectional image processing apparatus 100 may be in the shape of an open necklace that is open on one side thereof, as illustrated in FIG. 1, or in the shape of a non-open necklace. In the description that follows, it is assumed that the omnidirectional image processing apparatus 100 has a U shape that is open on one side thereof. The omnidirectional image processing apparatus 100, which is U-shaped, may be worn around the neck of the user as a wearable device and may be able to capture an omnidirectional image.

For convenience, it is assumed that the omnidirectional image processing apparatus 100 is worn around the neck of the user in the shape of a necklace (or in the shape of an open necklace that is open on one side thereof or in a U shape). However, the omnidirectional image processing apparatus 100 may not necessarily be worn around the neck of the user. For example, the omnidirectional image processing apparatus 100 may acquire an omnidirectional image by being hung on/attached to other parts of the body of the user or an external object.

The user can wear the omnidirectional image processing apparatus 100 around his or her neck and can thus acquire a plurality of images for generating an omnidirectional image with both hands free.

The omnidirectional image processing apparatus 100 may include a plurality of image capturing units. The plurality of image capturing units may be provided in the omnidirectional image processing apparatus 100 to be a particular distance (or a predetermined distance) apart from one another and may independently capture images in accordance with a predetermined field of view/image capturing line. The locations of the plurality of image capturing units may be fixed in the omnidirectional image processing apparatus 100, or the plurality of image capturing units may be movable so that their locations may vary.

For example, the omnidirectional image processing apparatus 100 may include three image capturing units, and the three image capturing units may capture an omnidirectional image with a predetermined field of view (e.g., 120 degrees to 180 degrees). The three image capturing units may be first, second, and third image capturing units 110, 120, and 130.

For convenience, an omnidirectional image processing apparatus 100 including three image capturing units will be described below. However, the omnidirectional image processing apparatus 100 may be modified to include a plurality of image capturing units other than three (e.g., two, four, five, or six image capturing units) to capture an omnidirectional image, without departing from the spirit and scope of the present inventive concept.

The first, second, and third image capturing units 110, 120, and 130 may capture an image in accordance with a predetermined field of view. At given time resources, a first image may be generated by the first image capturing unit 110, a second image may be generated by the second image capturing unit 120, and a third image may be generated by the third image capturing unit 130. The first, second, and third image capturing units 110, 120, and 130 may have a field of view of 120 degrees or greater, and there may exist overlapping areas between the first, second, and third images. Thereafter, an omnidirectional image may be generated by stitching together and/or correcting the first, second, and third images, which are captured at the given time resources by the omnidirectional image processing apparatus 100. The stitching and/or the correcting of a plurality of images may be performed by the omnidirectional image processing apparatus or may be performed by a user device (such as a smartphone) that can communicate with the omnidirectional image processing apparatus 100. That is, additional image processing for a plurality of images generated may be performed by the omnidirectional image processing apparatus 100 and/or another image processing apparatus (such as a smartphone, a personal computer (PC), or the like).

The characteristics of the omnidirectional image processing apparatus and an omnidirectional image generation method will hereinafter be described.

FIG. 2 is a schematic view showing the characteristics of a plurality of image capturing units provided in the omnidirectional image processing apparatus according to an exemplary embodiment of the present inventive concept.

FIG. 2 shows the characteristics of a plurality of image capturing units provided in a U-shaped omnidirectional image processing apparatus. The locations of the plurality of image capturing units illustrated in FIG. 2 are merely exemplary. The plurality of image capturing units may be disposed at various locations in the omnidirectional image processing apparatus to capture a plurality of images for generating an omnidirectional image.

The rear of the omnidirectional image processing apparatus is as illustrated in the upper part of FIG. 2.

First and second image capturing units 210 and 220, which are included in the omnidirectional image processing apparatus, may be located at a curved part of the omnidirectional image processing apparatus where curvature is present. Specifically, when a user wears the omnidirectional image processing apparatus around his or her neck as a wearable device, the first and second image capturing units 210 and 220 may be provided at the curved part of the omnidirectional image processing apparatus that is in contact with the back of the neck of the user. For example, the first and second image capturing units 210 and 220 may be a predetermined distance apart from a point on the U-shaped omnidirectional image processing apparatus with a maximum curvature (e.g., the middle part of the U-shaped omnidirectional image processing apparatus).

The first image capturing unit 210 may capture an image of a region including a rear left blind spot with respect to the user's line of sight. The second image capturing unit 220 may capture an image of a region including a rear right blind spot with respect to the user's line of sight. Specifically, the first image capturing unit 210 may have a first field of view and may capture an image of a region corresponding to the first field of view. The second image capturing unit 220 may have a second field of view and may capture an image of a region corresponding to the second field of view. For example, the first and second fields of view may be 120 degrees to 180 degrees.

When image capturing is performed by the first and second image capturing units 210 and 220, a first overlapping area 215, which is the overlapping area of the first and second fields of view, may be generated. Thereafter, an omnidirectional image may be generated through image stitching in consideration of the overlapping area.

The front of the omnidirectional image processing apparatus is as illustrated in the lower part of FIG. 2.

A third image capturing unit 230 may be disposed at the front of the omnidirectional image processing apparatus. Specifically, the third image capturing unit 230 may be disposed at an end portion of the omnidirectional image processing apparatus (i.e., at an end portion of the U-shaped omnidirectional image processing apparatus). When a user wears the omnidirectional image processing apparatus around his or her neck as a wearable device, the end portion of the U-shaped omnidirectional image processing apparatus may face forward (i.e., toward the direction of the user's line of sight). The omnidirectional image processing apparatus includes first and second end portions, and the third image capturing unit 230 may be disposed at one of the first and second end portions.

The third image capturing unit 230 may perform image capturing in the same direction as the user's line of sight to capture an image of a region corresponding to the user's line of sight.

Specifically, the third image capturing unit 230 may have a third field of view and may capture an image of a region corresponding to the third field of view. For example, the third field of view may be 120 degrees to 180 degrees. When image capturing is performed by the third image capturing unit 230, a second overlapping area 225, which is the overlapping area of the first field of view of the first image capturing unit 210 and the third field of view of the third image capturing unit 230, may be generated. Also, when image capturing is performed by the third image capturing unit 230, a third overlapping area 235, which is the overlapping area of the second field of view of the second image capturing unit 220 and the third field of view of the third image capturing unit 230, may be generated.

Due to the structural characteristics of the omnidirectional image processing apparatus as a wearable device that can be worn around the neck of a user, the first and second image capturing units 210 and 220 may be positioned higher than the third image capturing unit 230 on the basis of the ground. Also, the third image capturing unit 230 may be disposed at only one end portion of the omnidirectional image processing apparatus.

In an existing omnidirectional image processing apparatus, a plurality of image capturing units may be configured to be disposed at the same height and a predetermined angle, but in the omnidirectional image processing apparatus according to an exemplary embodiment of the present inventive concept, a plurality of image capturing units may be configured to have different angles with respect to each other and to be disposed at different heights. Thus, the first, second, and third overlapping areas 215, 225, and 235, which are generated by a plurality of images captured by the plurality of image capturing units of the omnidirectional image processing apparatus according to an exemplary embodiment of the present inventive concept, may have different sizes and/or different shapes.

Thereafter, an omnidirectional image may be generated by performing image processing (such as image stitching/correction) on the first, second, and third images each generated by the first, second, and third image capturing units 210, 220, and 230 in consideration of the first, second, and third overlapping areas 215, 225, and 235.

The first, second, and third fields of view may be set to be the same, or to differ from one another, without departing from the spirit and scope of the present inventive concept.

FIG. 3 is a schematic view illustrating image capturing lines of a plurality of image capturing units according to an exemplary embodiment of the present inventive concept.

FIG. 3 illustrates image capturing lines of a plurality of image capturing units installed in an omnidirectional image processing apparatus according to an exemplary embodiment of the present inventive concept. Assuming that the ground is parallel to the X-Z plane formed by the X axis and the Z axis, the plurality of image capturing lines may be defined as lines vertically penetrating the centers of the lenses of the plurality of image capturing units included in the omnidirectional image processing apparatus according to an exemplary embodiment of the present inventive concept in a space defined by the X axis, the Y axis, and the Z axis.

In an existing omnidirectional image processing apparatus, a plurality of image capturing units may be implemented at the same height at a predetermined angle (for example, 120 degrees). In this case, a plurality of image capturing lines of the plurality of image capturing units included in the existing omnidirectional image processing apparatus may be a plurality of lines extending in parallel to the ground (or the X-Z plane) and having a predetermined angle (for example, 120 degrees) with respect to one another.

As already described above, in the omnidirectional image processing apparatus according to an exemplary embodiment of the present inventive concept, the plurality of image capturing units may have different heights (or locations) and different angles with respect to one another (or the image capturing lines of the plurality of image capturing units have different angles with respect to one another) during image capturing. Thus, the properties of the image capturing lines of the omnidirectional image processing apparatus according to an exemplary embodiment of the present inventive concept differ from the properties of the image capturing lines of the existing omnidirectional image processing apparatus.

The image capturing lines of the plurality of image capturing units, illustrated in FIG. 3, are exemplary for showing differences in properties (for example, in height and angle) between the image capturing lines of the plurality of image capturing units, resulting from the characteristics of a wearable device. Also, the image capturing lines of FIG. 3 may be image capturing lines when a user who wears the omnidirectional image processing apparatus according to an exemplary embodiment of the present inventive concept does not move or the omnidirectional image processing apparatus according to an exemplary embodiment of the present inventive concept is fixed in a particular state.

The upper part of FIG. 3 illustrates image capturing lines of first and second image capturing units 310 and 320.

The first and second image capturing units 310 and 320 may be positioned relatively higher than a third image capturing unit 330. Assuming that a user who wears the omnidirectional image capturing apparatus around is standing in a Y-axis direction, due to the structural characteristics of a wearable device that can be worn on the neck, a part of the omnidirectional image capturing apparatus with curvature (i.e., a curved/central part of a U shape) where the first and second image capturing units 310 and 320 are disposed may be relatively raised, and a leg part of the omnidirectional image capturing apparatus (i.e., an end part of the U shape) where the third image capturing unit 330 is disposed may be relatively dropped.

For example, a first image capturing line 315 of the first image capturing line 310 may be parallel to the X-Z plane and may have a first angle, a second angle, and a third angle with respect to the X axis, the Y axis, and the Z axis, respectively, at a point "a" on the Y axis.

A second image capturing line 325 of the second image capturing unit 320 may be parallel to the X-Z plane and may have a fourth angle, a fifth angle, and a sixth angle with respect to the X axis, the Y axis, and the Z axis, respectively, at the point "a" on the Y axis.

Referring to the lower part of FIG. 3, a third image capturing line 335 of the third image capturing unit 330 may be parallel to the X-Z plane and may have a seventh angle, an eighth angle, and a ninth angle with respect to the X axis, the Y axis, and the Z axis, respectively, at a point "b" on the Y axis. Here, b may be a smaller value than a. The third image capturing line 335 of the third image capturing unit 330 may be parallel to the X-Z plane and may face forward like the user's line of sight (for example, toward a direction perpendicular to the X-Y plane).

That is, the first and second image capturing lines 315 and 325 may have the same height with respect to the Y axis, and the third image capturing line 335 may be positioned relatively lower than the first and second image capturing lines with respect to the Y axis. The first, second, and third image capturing lines 315, 325, and 335 illustrated in FIG. 3 are exemplary image capturing lines having different properties, and various image capturing lines other than those set forth herein can be defined to capture an omnidirectional image.

FIG. 4 is a schematic view illustrating image capturing lines of a plurality of image capturing units according to an exemplary embodiment of the present inventive concept.

FIG. 4 illustrates image capturing lines of a plurality of image capturing units, which are different from those of FIG. 3. It is assumed that the ground is parallel to the X-Z plane formed by the X axis and the Z axis.

The upper part of FIG. 4 illustrates image capturing lines of first and second image capturing units 410 and 420.

The first and second image capturing units 410 and 420 may be positioned relatively higher than a third image capturing unit 430. Assuming that a user is standing in a Y-axis direction, due to the structural characteristics of a wearable device that can be worn around the neck, image capturing may be performed in a state in which a part of the omnidirectional image capturing apparatus with curvature (i.e., a curved part of a U shape) where the first and second image capturing units 410 and 420 are disposed is relatively raised and a leg part of the omnidirectional image capturing apparatus (i.e., an end part of the U shape) where the third image capturing unit 430 is disposed is relatively dropped.

For example, a first image capturing line 415 of the first image capturing line 410 may be parallel to the X-Z plane and may have a first angle, a second angle, and a third angle with respect to the X axis, the Y axis, and the Z axis, respectively, at a point "a" on the Y axis.

A second image capturing line 415 of the second image capturing unit 420 may be parallel to the X-Z plane and may have a fourth angle, a fifth angle, and a sixth angle with respect to the X axis, the Y axis, and the Z axis at the point "a" on the Y axis.

The lower part of FIG. 4 illustrates an image capturing line of the third image capturing unit 430.

A third image capturing line 435 of the third image capturing unit 430 may be parallel to the X-Z plane and may have a seventh angle, an eighth angle, and a ninth angle with respect to the X axis, the Y axis, and the Z axis, respectively, at a point "b" on the Y axis.

Since the third image capturing unit 430 is disposed at an end portion of the omnidirectional image processing apparatus, the third image capturing line may not be parallel to the X-Z plane and may have a predetermined angle (for example, 0 to 30 degrees) with respect to the X-Z plane.

That is, the first and second image capturing lines 415 and 425 may have the same height with respect to the Y axis, and the third image capturing line 435 may be positioned relatively lower than the first and second image capturing lines 415 and 425 with respect to the Y axis. Also, the first and second image capturing lines 415 and 425 may be parallel to the X-Z plane, but the third image capturing line 435 may not be parallel to the X-Z plane.

In another exemplary embodiment of the present inventive concept, the first image capturing line of the first image capturing unit may form a first' angle with respect to the X-Z plane and may have a first angle, a second angle, and a third angle with respect to the X axis, the Y axis, and the Z axis, respectively, starting from the point "a" on the Y axis. Also, the second image capturing line of the second image capturing unit may form the first' angle with respect to the X-Z plane and may have a fourth angle, a fifth angle, and a sixth angle with respect to the X axis, the Y axis, and the Z axis, respectively, starting from the point "a" on the Y axis. The third image capturing line of the third image capturing unit may form a second' angle with respect to the X-Z plane and may have a seventh angle, an eighth angle, and a ninth angle with respect to the X axis, the Y axis, and the Z axis, respectively, starting from a point "b" on the Y axis.

In yet another exemplary embodiment of the present inventive concept, the first image capturing line of the first image capturing unit may form angle 1' with respect to the X-Z plane and may have a first angle, a second angle, and a third angle with respect to the X axis, the Y axis, and the Z axis, respectively, starting from the point "a" on the Y axis. Also, the second image capturing line of the second image capturing unit may form a second' angle with respect to the X-Z plane and may have a fourth angle, a fifth angle, and a sixth angle with respect to the X axis, the Y axis, and the Z axis, respectively, starting from the point "a" on the Y axis. The third image capturing line of the third image capturing unit may form a third' angle with respect to the X-Z plane and may have a seventh angle, an eighth angle, and a ninth angle with respect to the X axis, the Y axis, and the Z axis, respectively, starting from the point "b" on the Y axis.

That is, in the omnidirectional image processing apparatus according to an exemplary embodiment of the present inventive concept, the image capturing lines of a plurality of image capturing units may be positioned at different points on the Y axis and may have different angles with respect to the ground (or the X-Z plane) unlike in an image processing apparatus where the image capturing lines of a plurality of image capturing units have the same angle with respect to the ground at a given point on the Y axis.

Hereinafter, a method for displaying direction information in a generated omnidirectional image is disclosed in an embodiment of the present invention. FIGS. 1 to 3 show an example of an omnidirectional image processing device. An omnidirectional image and the direction information thereof may be generated not only by the omnidirectional image processing device disclosed in the above-described embodiment of the present invention but also by various other omnidirectional image processing devices.

Figure 5:
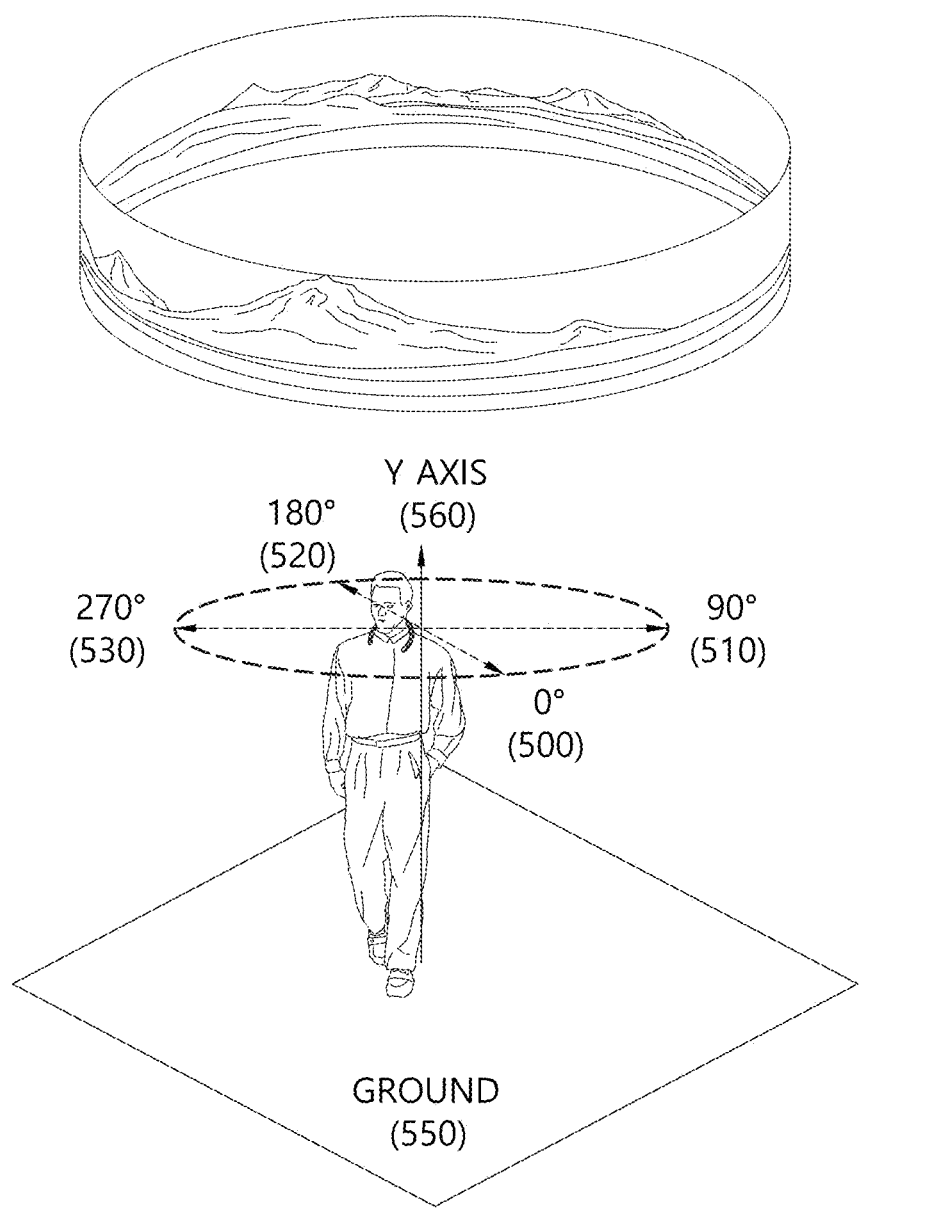
FIG. 5 is a schematic view illustrating a method of generating or displaying direction information of an omnidirectional image according to an embodiment of the present invention.

FIG. 5 is a schematic view illustrating a method of generating or displaying direction information of an omnidirectional image according to an embodiment of the present invention.

FIG. 5 shows a method for additionally generating direction information as attribute information upon generating omnidirectional image information and displaying an indicator of a specific direction on the basis of the direction information upon playing back an omnidirectional image.

Referring to FIG. 5, an omnidirectional image processing device may include a sensor unit capable of sensing a compass direction or a direction, such as a geomagnetic sensor and an accelerometer/gyroscope.

When a plurality of images are respectively generated by a plurality of image capturing units included in the omnidirectional image processing device, direction information, which is information on an image-capturing direction, may be included as additional attribute information in each of the plurality of images.

Specifically, when image capturing is performed by the plurality of image capturing units included in the omnidirectional image processing device, the sensor unit may sense respective image-capturing directions of the plurality of image capturing units and generate information on the image-capturing directions.

For example, the omnidirectional image processing device may include image capturing unit 1, image capturing unit 2, and image capturing unit 3. Also, at overlapping time resources, image 1 may be generated by image capturing unit 1, image 2 may be generated by image capturing unit 2, and image 3 may be generated by image capturing unit 3. Image 1, image 2, and image 3 may be generated as omnidirectional image information through image processing.

The sensor unit of the omnidirectional image processing device may generate direction information determined for omnidirectional image information generated from image 1, image 2, and image 3 on the basis of a specific axis. Assuming that an image capturing space is a three-dimensional (3D) space formed by an X axis, a Y axis, and a Z axis and a ground surface 550 is parallel to the X-Z plane, direction information of the image based on an Y axis 560 which is perpendicular to the X-Z plane may be added to the omnidirectional image information as attribute information.

For convenience of description and understanding, hereinafter, it is assumed that direction information of an image based on the Y axis 560 which is perpendicular to the X-Z plane is added to omnidirectional image information as attribute information. However, direction information of an image based on the X axis or the Z axis may be added to omnidirectional image information as attribute information, and such an embodiment is also included in the scope of the present invention.

For example, due north is set to 0 degrees (a reference point) 500 such that a direction may be expressed with an angle of 360 degrees on the basis of the Y axis 560. For example, a 90-degree point 510 may be due west, a 180-degree point 520 may be due south, and a 270-degree point 530 may be due east.

Direction information sensed and generated at a specific time point by the sensor unit and time information of the specific time point may be included as attribute information of omnidirectional image information generated on the basis of image 1, image 2, and image 3 captured at the specific time point. In other words, the omnidirectional image information may include the time information of the time point at which the omnidirectional image has been captured and the direction information of the direction in which the omnidirectional image has been captured as attribute information.

Such direction information may be expressed in various ways. For example, direction information may be expressed as a percentage (a value of 0 to 100) on the basis of the size of an image. Alternatively, direction information may be expressed as a relative angle from a reference point set on the basis of the size of an area to be stored as a value of 0 to 255.

A storage interval of direction information of an omnidirectional image may not coincide with a framerate of frames generated by the omnidirectional image processing device. For example, direction information may be generated as attribute information of omnidirectional image information every time a specific time interval determined to be different from the framerate or a set condition is satisfied.

Figure 6:
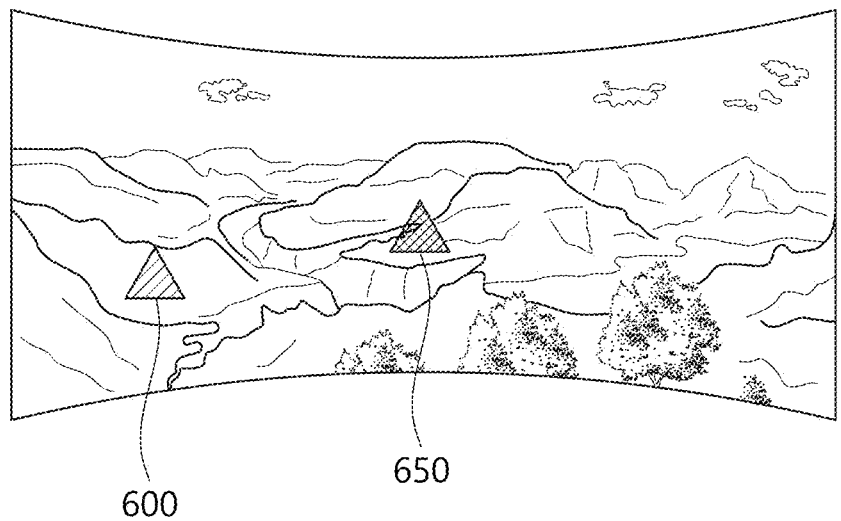
FIG. 6 is a conceptual view showing a method of displaying direction information upon playing back an omnidirectional image according to an embodiment of the present invention.

FIG. 6 is a conceptual view showing a method of displaying direction information upon playing back an omnidirectional image according to an embodiment of the present invention.

FIG. 6 shows a method for adding a direction indicator for identifying a specific direction, such as due north or a photographer's line-of-sight direction, on the basis of direction information upon playing back an omnidirectional image.

Referring to FIG. 6, an omnidirectional image playback device may additionally display a direction indicator for identifying a direction at a specific position on a playback screen (or an output screen) of an omnidirectional image on the basis of direction information included as attribute information of omnidirectional image information.

For example, a due north indicator (e.g., a first triangle) 600 indicating due north may be displayed on a playback screen of the omnidirectional image playback device (e.g., a virtual reality (VR) device) on the basis of direction information. Also, a direction identification indicator indicating a direction (east, south, west, or the like) other than the due north indicator 600 may be added to deliver information on a direction.

Further, a photographer's line-of-sight indicator (e.g., a second triangle) 650 indicating a photographer's line of sight may be output from the omnidirectional image playback device which outputs omnidirectional image information.

A user who views such an omnidirectional image may recognize a direction of the played-back omnidirectional image on the basis of the due north indicator 600, the photographer's line-of-sight indicator 650, and the like. Therefore, it is possible to help the user to recognize a current direction of view in the omnidirectional image and understand the omnidirectional image. Also, the user can rapidly recognize a front direction of a photographer who has captured the omnidirectional image on the basis of the line-of-sight indicator 650 of the photographer and appreciate the omnidirectional image according to a photographic intention of the photographer.

Figure 7:
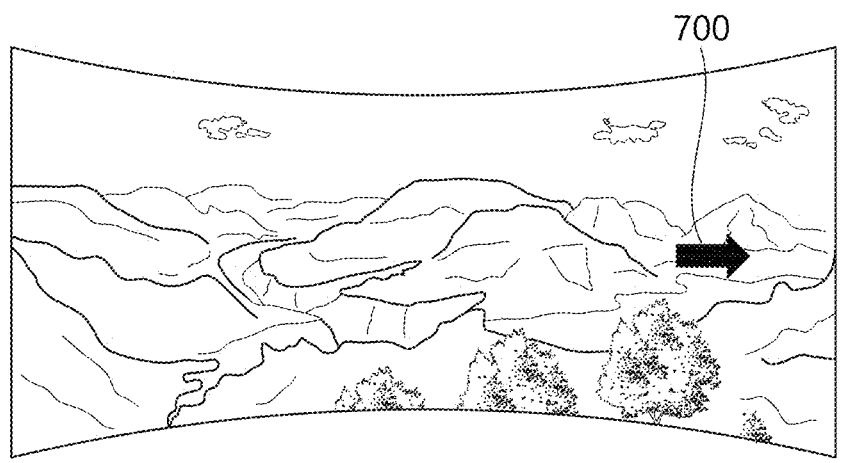
FIG. 7 is a conceptual view showing a method of outputting a change of direction request indicator according to an embodiment of the present invention when an omnidirectional image is played back.

FIG. 7 is a conceptual view showing a method of outputting a change of direction request indicator according to an embodiment of the present invention when an omnidirectional image is played back.

FIG. 7 shows a line-of-sight drawing indicator 700 for recommending a user to see a specific direction in an omnidirectional image.

Direction information may be included as attribute information of omnidirectional image information, and a photographer who captures or generates the omnidirectional image information or an editor who edits the omnidirectional image information may set a specific direction as a main view direction of the user who views the omnidirectional image. The main view direction may not be a fixed direction and may be changed a plurality of times according to the intention of setting the main view direction.

For example, due north or a photographer's line-of-sight direction may be set as the main view direction of the omnidirectional image. In this case, the omnidirectional image playback device may output the line-of-sight drawing indicator 700 to draw the user's current line-of-sight direction to the set main view direction.

The omnidirectional image playback device may calculate an error (or a difference) between the user's current line-of-sight direction and the main view direction and additionally display the line-of-sight drawing indicator 700 in the omnidirectional image to draw the user's line-of-sight to the main view direction.

The shape of the line-of-sight drawing indicator 700 may vary according to the error between the user's current line-of-sight direction and the main view direction. For example, when the line-of-sight drawing indicator 700 is an arrow-shaped image, the shape, length, etc. of the arrow may vary according to the error between the current line-of-sight direction and the main view direction. Also, the line-of-sight drawing indicator 700 may be a blinking image, which may vary according to the error between the current line-of-sight direction and the main view direction.

When the user changes his or her line-of-sight direction on the basis of the line-of-sight drawing indicator 700 and the error between the current line-of-sight direction and the main view direction is reduced, the shape of the line-of-sight drawing indicator 700 may be changed to reflect the reduced error.

The user's current line-of-sight direction may be changed when the user wearing a VR playback device turns his or her neck or moves his or her body or the user viewing a monitor drags the omnidirectional image with a mouse.

When the user's current line-of-sight direction is included in a threshold range which is set on the basis of the main view direction, the line-of-sight drawing indicator 700 may disappear.

Alternatively, when the user's current line-of-sight direction comes within the threshold range set on the basis of the main view direction, the image of the line-of-sight drawing indicator 700 may be changed to another shape or an additional identifier indicating the main view direction may be additionally displayed on the omnidirectional image so as to make the user's current line-of-sight direction coincide with the main view direction. Then, it is possible to draw the user's current line-of-sight direction to the main view direction more accurately.

Also, according to another embodiment of the present invention, the omnidirectional image playback device may set a direction of the played-back omnidirectional image so that the main view direction may coincide with the user's current line-of-sight even when the user does not turn his or her head.

For example, assuming that the main view direction is due north, the user may change his or her current line-of-sight direction within a threshold time by turning his or her head, moving his or her body, or mouse dragging, but the user's current line-of-sight direction may be changed to due north after the threshold time. In other words, it is possible to ignore the user's actions which have changed the user's current line-of-sight direction during the threshold time and periodically and forcibly change the user's current line-of-sight direction to due north which has been set as the main view direction so that the user's current line-of-sight direction may periodically become identical to the main view direction.

FIG. 8 is a conceptual view showing a method of generating direction information according to an embodiment of the present invention.

FIG. 8 shows a method for determining a direction other than a direction sensed in an omnidirectional image on the basis of sensed direction information.

Referring to FIG. 8, only specific direction information (e.g., due north information) may be sensed by the sensor unit and recorded in omnidirectional image information as attribute information.

Subsequently, when it is intended to set a direction indicator of a direction other than a direction sensed in the omnidirectional image, it is possible to generate direction information of a non-sensed direction on the basis of the sensed direction.

As described above, the omnidirectional image processing device may include three image capturing units (image capturing unit 1, image capturing unit 2, and image capturing unit 3). Omnidirectional image information generated on the basis of image 1, image 2, and image 3 generated by the three image capturing units may include direction information indicating the sensed direction (a first direction) as attribute information.

When only the information on the sensed direction (the first direction) is included as attribute information and a specific direction among fields of view of image 1 is the first direction, the first direction may be set to 0 degrees 850 in image 1, and the angle of another specific direction in the omnidirectional image may be represented as 0 to 360 degrees through interpolation.

Information on the field of view of an image may be used for interpolation. For example, assuming that the field of view of image 1 is 150 degrees (from −75 degrees to +75 degrees), interpolation may be performed to determine direction information of a specific direction in image 1 on the basis of the first direction set to 0 degrees 850 and the field of view. For example, a difference between a center direction of the field of view of image 1 and the first direction may be calculated, and direction information of other points of image 1 may be determined using the first direction (0 degrees 850) as a new reference point. For example, when the first direction is +20 degrees 800 on the basis of the field of view, +20 degrees 800 based on the field of view may be set to 0 degrees 850 as a reference point for representing direction information. In other words, direction information of other directions (from −75 degrees to +75 degrees) based on the field of view in image 1 may be interpolated and expressed as −95 degrees (265 degrees) to +55 degrees on the basis of the first direction which is the new reference point by considering the field of view.

Also, in the case of image 2 and image 3, an interpolation procedure may be performed by considering direction information of an area overlapping image 1 and the field of view of image 2 or image 3. For example, when direction information of object A positioned in an overlapping area between image 1 and image 2 is determined to be 45 degrees through the above-described interpolation procedure for image 1, a direction of identical object A may be set to 45 degrees in image 2, and direction information of other directions may be set by considering the field of view (−75 degrees to +75 degrees) of image 2.

Alternatively, according to another embodiment of the present invention, the sensor unit may include direction information corresponding to a center direction of the field of view of each of image 1, image 2, and image 3 as attribute information to interpolate direction information. When direction information of a specific point is necessary, direction information of image 1, image 2, and image 3 may be generated through interpolation by considering the direction information of a center point of the field of view of each of image 1, image 2, and image 3 and information on the field of view of each of image 1, image 2, and image 3.

Figure 9:
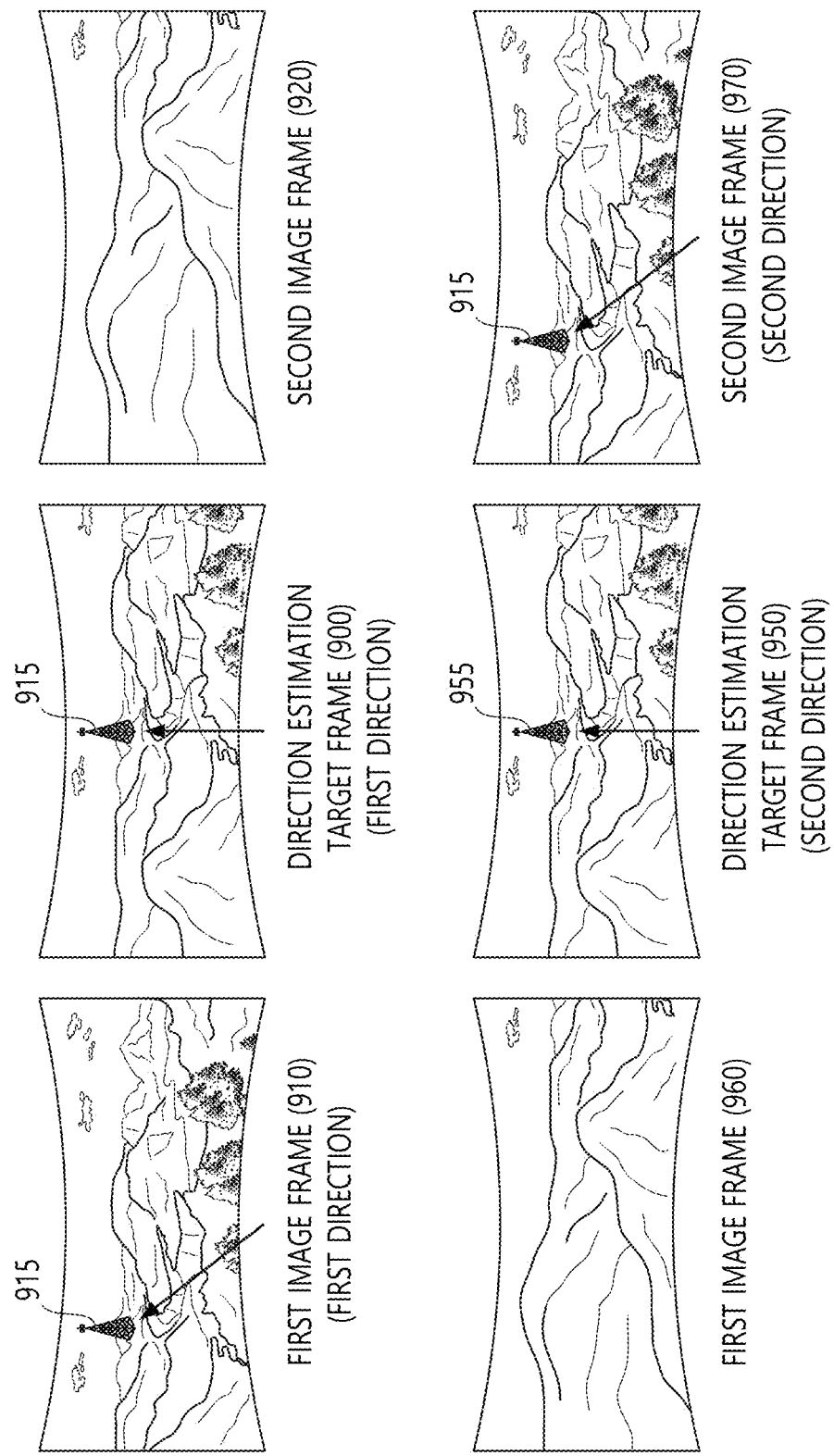
FIG. 9 is a set of conceptual views showing a method of generating direction information according to an embodiment of the present invention.

FIG. 9 is a set of conceptual views showing a method of generating direction information according to an embodiment of the present invention.

FIG. 9 shows a method for generating direction information of an image (an image frame) captured during a certain time interval when direction information is generated at the certain time intervals.

It is possible to assume that direction information is sensed by the sensor unit at intervals of 1 second. In this case, the difference between a first direction information generation time point and a second direction information generation time point may be 1 second.

An image frame generated between the first direction information generation time point and the second direction information generation time point may not include direction information. In this case, it is possible to estimate direction information of the image frame generated between the first direction information generation time point and the second direction information generation time point (hereinafter, "direction estimation target frame") by considering first direction information of a first image frame of the first direction information generation time point and/or second direction information of a second image frame of the second direction information generation time point.

Referring to the upper views of FIG. 9, it is possible to determine a fixed object 915 which does not move and is included in common in a first image frame 910 and a direction estimation target frame 900. The fixed object 915 may be an object such as a building or a sculpture. When a difference of the first direction information generation time point and the second direction information generation time point are equal to or less than a threshold time, a moving object (or a non-fixed object) which is not fixed may also be used to determine direction information of the direction estimation target frame.

It is possible to assume that direction information of the fixed object 915 indicates the first direction in the first image frame 910. The direction information of the fixed object 915 may be identical to direction information of the fixed object 915 likewise included in the direction estimation target frame 900. Another direction in the direction estimation target frame 900 may be determined on the basis of the determined direction information of the fixed object 915 and the field of view.

Referring to the lower views of FIG. 9, when no fixed object which does not move is included in common in the first image frame 960 and a direction estimation target frame 950, it is possible to determine a fixed object 955 which does not move and is included in common in a second image frame 970 and a direction estimation target frame 950.

Subsequently, it is possible to assume that direction information of the fixed object 955 indicates the second direction in the second image frame 970. In this case, direction information of the fixed object 955 likewise included in the direction estimation target frame 950 may also indicate the second direction. Another direction in the direction estimation target frame 950 may be determined on the basis of the determined direction information of the fixed object 955 and the field of view.

No fixed object may be included in common in a first image frame and a direction estimation target frame, and no fixed object may be included in common in a second image frame and the direction estimation target frame, either. In this case, it is possible to determine direction information of the direction estimation target frame on the basis of a moving object rather than a fixed object.

Likewise, it is possible to determine a moving object (a non-fixed object) included in common in the first image frame and the direction estimation target frame.

Subsequently, a first direction indicated by direction information of the non-fixed object in the first image frame may be direction information of the non-fixed object likewise included in the direction estimation target frame. Another direction in the direction estimation target frame may be determined on the basis of the determined direction information of the non-fixed object and the field of view.

When no non-fixed object is included in common in the first image frame and the direction estimation target frame, it is possible to determine a non-fixed object which is included in common in the second image frame and the direction estimation target frame.

Subsequently, a second direction indicated by direction information of the non-fixed object in the second image frame may be direction information of the non-fixed object likewise included in the direction estimation target frame. Another direction in the direction estimation target frame may be determined on the basis of the determined direction information of the non-fixed object and the field of view.

FIG. 10 is a conceptual view showing a method of generating identification information by considering a user's interest according to an embodiment.

FIG. 10 shows a method of adding a direction indicator of a played-back omnidirectional image in which a user is interested.

Referring to FIG. 10, when a user views an omnidirectional image, the user may view the omnidirectional image while tracking a specific object in the omnidirectional image.

As an example, when the omnidirectional image is an image of a flying eagle, the user may appreciate the image while tracking the movement of the eagle in the omnidirectional image. As another example, when an omnidirectional image is used to track the location of a criminal, the user may track the movement of the criminal who moves in the omnidirectional image. According to the characteristic of omnidirectional images, a specific object, such as an eagle or a criminal, may move in a specific direction among 360-degree directions.

According to an embodiment of the present invention, an omnidirectional image playback device may determine an object that the user views with interest, track the movement of the object, and cause the user to change his or her current line-of-sight direction.

First, the omnidirectional image playback device may determine an object of interest 1020 that the user views with interest.

The omnidirectional image playback device may determine the object of interest 1020 that the user views with interest by determining whether at least one object is present within a threshold range 1050 based on the user's line-of-sight direction 1000 for a threshold time or more. The user's line-of-sight direction 1000 may be a center direction of an image which is currently output on a display. A method of determining an object of interest will be described in detail below.

The omnidirectional image playback device determines whether the object of interest 1020 deviates from the threshold range 1050 based on the user's line-of-sight direction 1000.

When the object of interest 1020 deviates from the threshold range 1050 based on the user's line-of-sight direction 1000, the omnidirectional image playback device may give the user information on a direction in which the object of interest 1020 moves by generating an object location indicator 1030.

The object location indicator 1030 may be an indicator such as an arrow, and the user may track the movement direction of the object on the basis of the object location indicator 1030.

FIG. 11 is a conceptual view showing a method of determining a user's object of interest according to an embodiment of the present invention.

FIG. 11 shows a method for determining an object of interest of a user who views an omnidirectional image.

Referring to FIG. 11, when an object 1150 is present within a threshold range 1100 of a first line-of-sight direction 1110 at a first time point 1160 and the same object 1150 is present within the threshold range 1100 of a second line-of-sight direction 1120 at a second time point 1170, the corresponding object 1150 may be set as an object of interest. The first time point 1160 and the second time point 1170 may be different time points of the threshold time.

When there are a plurality of objects satisfying the above condition, an object which is relatively closer to the first line-of-sight direction 1110 and the second line-of-sight direction 1120 may be set as an object of interest. For example, when an error between the direction of a first object and the first line-of-sight direction 1110 is 5 degrees, an error between the direction of the first object and the second line-of-sight direction 1120 is 10 degrees, an error between the direction of a second object and the first line-of-sight direction 1110 is 3 degrees, and an error between the direction of the second object and the second line-of-sight direction 1120 is 5 degrees, the second object may be set as an object of interest.

Alternatively, when there are a plurality of objects satisfying the above condition, a greater weight may be given to the second line-of-sight direction 1120 rather than the first line-of-sight direction 1110 such that an object closer to the second line-of-sight direction may be set as an object of interest. For example, when an error between the direction of a first object and the first line-of-sight direction 1110 is 7 degrees, an error between the direction of the first object and the second line-of-sight direction 1120 is 5 degrees, an error between the direction of a second object and the first line-of-sight direction 1110 is 10 degrees, and an error between the direction of the second object and the second line-of-sight direction 1120 is 2 degrees, the second object may be set as an object of interest.

A specific indicator may be added to an object set as an object of interest.

When a user wants to change objects of interest, it is possible to newly set an object of interest by making his or her line-of-sight direction coincide with an object which will be an object of interest.

Figure 12:
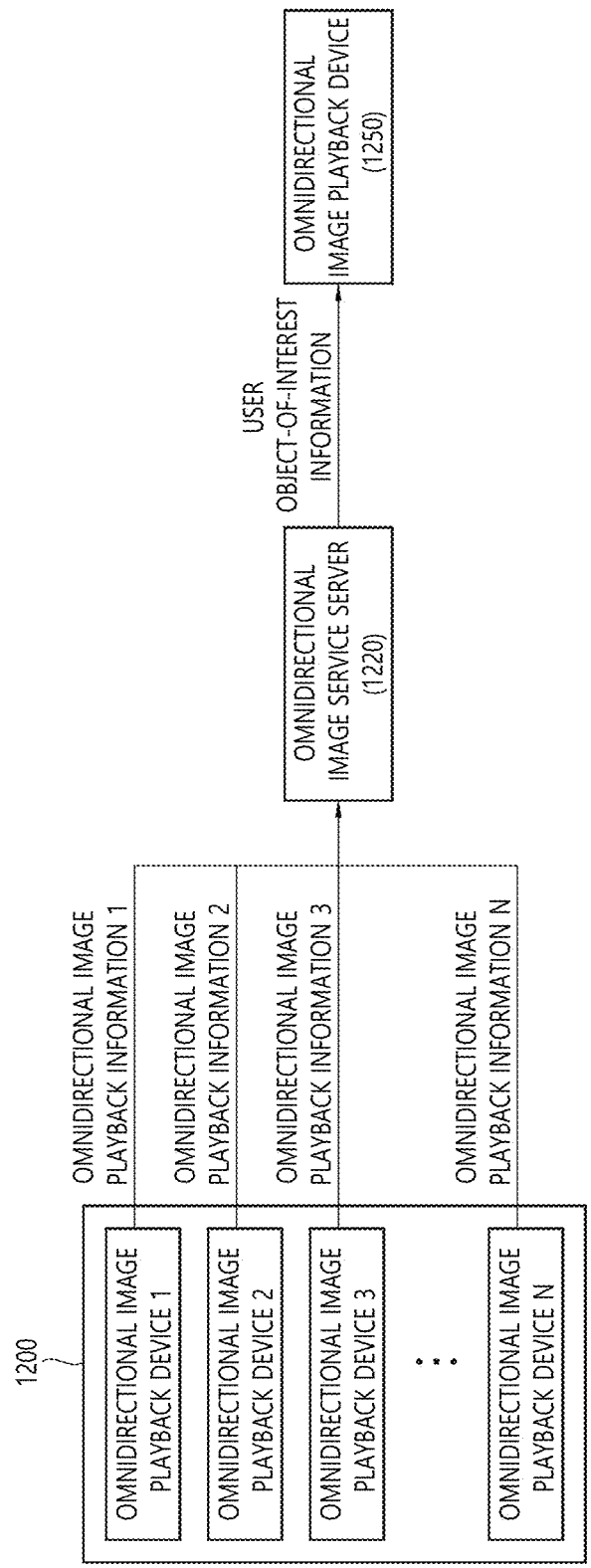
FIG. 12 is a conceptual view showing a method for determining a user's object of interest according to an embodiment of the present invention.

FIG. 12 is a conceptual view showing a method for determining a user's object of interest according to an embodiment of the present invention.

FIG. 12 shows a method for determining an object of interest of a user who views an omnidirectional image by considering other users' appreciation information of an omnidirectional image.

Referring to FIG. 12, view records of users who have viewed an omnidirectional image may be transmitted to an omnidirectional image service server 1220. A plurality of omnidirectional image playback devices 1200 may transmit omnidirectional image playback information, which is information related to the plurality of users' omnidirectional image playback, to the omnidirectional image service server 1220.

The omnidirectional image playback information may include view record information. The view record information may include information on the users' line-of-sight directions for a specific replay time in which an omnidirectional image is played back. For example, the view record information may include the users' line-of-sight direction information in specific playback time units (e.g., units of 1 second).

The omnidirectional image service server 1220 may extract information on an object that many of the plurality of users have viewed with interest (hereinafter, "user object-of-interest information") on the basis of the view record information. A user object-of-interest may be an object in which a certain threshold ratio of users or more are interested at a specific playback time point. The user object-of-interest information may be used for an omnidirectional image playback device 1250 to generate an object location indicator. The omnidirectional image service server 1220 may transmit the user object-of-interest information to the omnidirectional image playback device 1250. The omnidirectional image playback device 1250 may output an object location indicator for indicating a specific object in the played-back image on the basis of the user object-of-interest information.

In other words, it is possible to generate an object location indicator by considering view record information of other users and deliver information on a movement direction of a specific object in which other users have been interested to a user who views an omnidirectional image.

Figure 13:
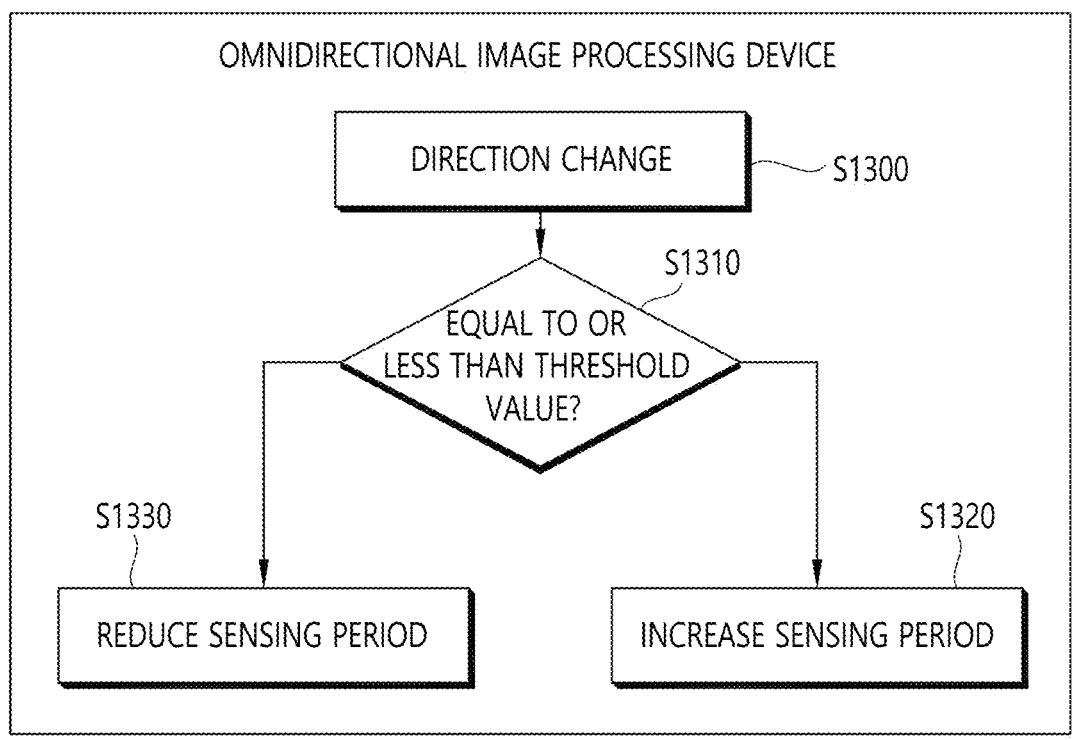
FIG. 13 is a conceptual view showing a method for adjusting a generation period of direction information on the basis of a photographer's movement according to an embodiment of the present invention.

FIG. 13 is a conceptual view showing a method for adjusting a generation period of direction information on the basis of a photographer's movement according to an embodiment of the present invention.

FIG. 13 shows a method of adjusting a generation period of direction information by considering the degree of movement of a photographer who captures an omnidirectional image. An omnidirectional image processing device may be implemented as a wearable device to capture images during movement, and a generation period of direction information may be adjusted.

Referring to FIG. 13, a sensor unit of the omnidirectional image processing device may sense the degree of a directional change of the omnidirectional image processing device, and a direction information sensing period may be set differently according to the degree of a directional change.

The degree of a directional change is sensed for a threshold time (step S1300), and when the degree of a directional change is a threshold value or less (step S1310), a direction information sensing period may be increased (step S1320). On the other hand, when the degree of a directional change exceeds the threshold value (step S1310), the direction information sensing period may be reduced (step S1330). The sensing period may be reduced to the minimum period value or increased to the maximum period value.

In other words, unless an image-capturing direction is not changed, the direction information sensing period may be gradually increased to the maximum period value. When the image-capturing direction is changed, the direction information sensing period may be gradually reduced to the minimum period value.

According to an embodiment of the present invention, the direction of the omnidirectional image processing device may be rapidly changed. In other words, when the degree of the directional change in the threshold time exceeds the threshold value, the direction information sensing period may be reduced to the minimum period value.

In the above-described embodiments of the present invention, for convenience of description, it has been assumed that an omnidirectional image processing device generates direction information and an omnidirectional image playback device processes the direction information and outputs an indicator. However, such an operation of generating, processing, or using direction information can be performed by not only the omnidirectional image processing device or the omnidirectional image playback device but also by various devices.

A device for generating, processing, or using direction information in an omnidirectional image and generating identification information or an indicator on the basis of the direction information may be termed a direction information processing device. In other words, a direction information processing device may be a device for generating and/or receiving direction information of an omnidirectional image and setting a direction indicator for the omnidirectional image on the basis of the direction information. Also, as described above, the direction information processing device may be a device for performing a function of causing a user who views an omnidirectional image to turn his or her line of sight to a specific direction on the basis of direction information. In other words, the direction information processing device may perform the functions described above in FIGS. 5 to 13, and these functions may be performed on the basis of a process of the direction information processing device. For example, the direction information processing device may receive direction information of an omnidirectional image on the basis of a communication unit and set a direction indicator for the omnidirectional image on the basis of the direction information using the processor.

The above-described embodiments of the present invention may be implemented in the form of program instructions executable by various computer elements and recorded in a computer-readable recording medium. The computer-readable recording medium may include program instructions, data files, data structures, etc. alone or in combination. The program instructions recorded on the computer-readable recording medium may be specially designed and configured for the present invention or known to and used by those of ordinary skill in the computer software field. Examples of the computer-readable recording medium include magnetic media, such as a hard disk, a floppy disk, and magnetic tape, optical media, such as a compact disc read-only memory (CD-ROM) and a digital versatile disc (DVD), magneto-optical media, such as a floptical disk, and hardware devices, such as a ROM, a random access memory (RAM), and a flash memory, specially configured to store and perform program instructions. Examples of the program instructions include not only machine language code produced by a compiler but also high-level language code that can be executed by a computer through an interpreter or the like. To perform the operations of the present invention, the hardware devices may be configured as one or more software modules, and vice versa.

While the present invention has been described above with reference to specific details, such as detailed elements, by way of limited embodiments and drawings, these are provided merely to aid the overall understanding of the present invention. The present invention is not limited to the embodiments, and various modifications and changes can be made thereto by those of ordinary skill in the technical field to which the present invention pertains.

Therefore, the spirit of the present invention should not be limited to the above-described embodiments, and the scope of the present invention should be regarded as encompassing not only the following claims but also their equivalents and variations.

The invention claimed is:

1. A method of generating direction information of an omnidirectional image, the method comprising:
   receiving, by a direction information processing device, direction information of an omnidirectional image; and
   setting, by the direction information processing device, a direction indicator for the omnidirectional image on the basis of the direction information,
   wherein the direction indicator indicates at least one direction on a playback screen of the omnidirectional image,
   wherein the direction information processing device further sets an object location indicator based on an object of interest,
   wherein the object of interest is determined when at least one object is present within a threshold range at least for a predetermined time, and a current line-of-sight direction of a user is at the center of the threshold range, and
   wherein the predetermined time includes a first time point and a second time point, and the object of interest is determined when the at least one object is present within the threshold range of a first line-of-sight direction at the first time point and the threshold range of a second line-of-sight direction at the second time point.

2. The method of claim 1, wherein the direction information is generated by a direction sensor unit when the omnidirectional image is generated, and
   the direction indicator indicates the at least one direction determined from among 360-degree directions based on a specific axis on the basis of the direction information.

3. The method of claim 2, wherein the direction indicator includes a photographer's line-of-sight direction indicator, and
   the photographer's line-of-sight direction indicator indicates a line-of-sight direction of a photographer who has captured the omnidirectional image.

4. The method of claim 3, wherein the omnidirectional image is generated on the basis of a plurality of images respectively captured by a plurality of image capturing units included in an omnidirectional image processing device, and
   the direction information indicates an image-capturing direction of at least one of the plurality of images.

5. The method of claim 4, wherein the at least one direction indicated by the direction indicator is determined on the basis of a direction based on the direction information, information on an overlapping area between the plurality of images, and field-of-view information of each of the plurality of images.

6. A direction information processing device for generating direction information of an omnidirectional image, the device comprising:
   a communication unit configured to receive direction information of an omnidirectional image; and
   a processor configured to be operatively connected to the communication unit and set a direction indicator for the omnidirectional image on the basis of the direction information,
   wherein the direction indicator indicates at least one direction on a playback screen of the omnidirectional image,
   wherein the processor is further configured to set an object location indicator based on an object of interest,
   wherein the object of interest is determined when at least one object is present within a threshold range at least for a predetermined time, and a current line-of-sight direction of a user is at the center of the threshold range, and
   wherein the predetermined time includes a first time point and a second time point, and the object of interest is determined when the at least one object is present within the threshold range of a first line-of-sight direction at the first time point and the threshold range of a second line-of-sight direction at the second time point.

7. The direction information processing device of claim 6, wherein the direction information is generated by a direction sensor unit when the omnidirectional image is generated, and
   the direction indicator indicates the at least one direction determined from among 360-degree directions based on a specific axis on the basis of the direction information.

8. The direction information processing device of claim 7, wherein the direction indicator includes a photographer's line-of-sight direction indicator, and
   the photographer's line-of-sight direction indicator indicates a line-of-sight direction of a photographer who has captured the omnidirectional image.

9. The direction information processing device of claim 8, wherein the omnidirectional image is generated on the basis of a plurality of images respectively captured by a plurality of image capturing units included in an omnidirectional image processing device, and
   the direction information indicates an image-capturing direction of at least one of the plurality of images.

10. The direction information processing device of claim 9, wherein the at least one direction indicated by the direction indicator is determined on the basis of a direction based on the direction information, information on an overlapping area between the plurality of images, and field-of-view information of each of the plurality of images.

11. A non-transitory computer-readable recording medium storing a computer program for executing the method of claim 1.

12. The method of claim 1, wherein the direction information processing device generates a line-of-sight drawing indicator to draw the current line-of-sight direction of the user to a predetermined direction in the omnidirectional image, and the line-of-sight drawing indicator is generated with account of the current line-of-sight direction of the user.

13. The method of claim 1, wherein assuming an image capturing space as a three-dimensional space formed by an X axis, a Y axis, and a Z axis, at least one of the X axis, the Y axis and the Z axis is determined as a reference axis, a predetermined direction is set as a reference direction based on the reference axis, and the direction indicator indicates a directional value that is relative from the reference direction.

14. The method of claim 1, wherein when the object of interest deviates from the threshold range, the direction information processing device gives a user information on a direction in which the object of interest moves by generating the object location indicator.

15. The direction information processing device of claim 6, wherein the processor generates a line-of-sight drawing indicator to draw the current line-of-sight direction of the user to a predetermined direction in the omnidirectional image, and the line-of-sight drawing indicator is generated with account of the current line-of-sight direction of the user.

16. The direction information processing device of claim 6, wherein assuming an image capturing space as a three-dimensional space formed by an X axis, a Y axis, and a Z axis, at least one of the X axis, the Y axis and the Z axis is determined as a reference axis, a predetermined direction is set as a reference direction based on the reference axis, and the direction indicator indicates a directional value that is relative from the reference direction.

17. The direction information processing device of claim 6, wherein when the object of interest deviates from the threshold range, the processor gives a user information on a direction in which the object of interest moves by generating the object location indicator.

* * * * *